United States Patent
Liu et al.

(10) Patent No.: US 12,520,107 B2
(45) Date of Patent: Jan. 6, 2026

(54) HANDLING CONCEPT DRIFT IN WI-FI-BASED LOCALIZATION

(71) Applicant: AERIAL TECHNOLOGIES INC., Montreal (CA)

(72) Inventors: Qianyu Liu, Montreal (CA); Negar Ghourchian, Montreal (CA); Michel Allegue Martinez, Montreal (CA); Raihan Seraj, Montreal (CA)

(73) Assignee: AERIAL TECHNOLOGIES INC., Montreal (CA)

( * ) Notice: Subject to any disclaimer, the term of this patent is extended or adjusted under 35 U.S.C. 154(b) by 0 days.

(21) Appl. No.: 18/438,864

(22) Filed: Feb. 12, 2024

(65) Prior Publication Data
US 2024/0187822 A1 Jun. 6, 2024

Related U.S. Application Data

(63) Continuation of application No. 17/383,654, filed on Jul. 23, 2021, now Pat. No. 11,902,857, which is a continuation of application No. PCT/IB2020/051503, filed on Feb. 22, 2020.

(60) Provisional application No. 62/809,011, filed on Feb. 22, 2019, provisional application No. 62/809,388, filed on Feb. 22, 2019.

(51) Int. Cl.
*H04W 84/12* (2009.01)
*H04B 17/318* (2015.01)
*H04W 4/029* (2018.01)

(52) U.S. Cl.
CPC .......... *H04W 4/029* (2018.02); *H04B 17/318* (2015.01); *H04W 84/12* (2013.01)

(58) Field of Classification Search
CPC .... G01S 5/0278; G01S 13/524; H04W 64/00; H04W 64/003
See application file for complete search history.

(56) References Cited

U.S. PATENT DOCUMENTS

| | | | |
|---|---|---|---|
| 11,271,629 B1 | 3/2022 | Um et al. | |
| 2003/0210749 A1 | 11/2003 | Asjadi | |
| 2011/0269481 A1* | 11/2011 | Halfmann | H04W 64/00 455/456.1 |
| 2018/0248720 A1* | 8/2018 | Park | H04B 7/0626 |
| 2023/0152419 A1* | 5/2023 | Kadambi | G01S 5/10 342/451 |

FOREIGN PATENT DOCUMENTS

| | | |
|---|---|---|
| CA | 3044480 A1 | 5/2018 |
| CA | 3220109 A1 | 5/2018 |
| CN | 105828289 A | 8/2016 |
| EP | 3316628 A1 | 5/2018 |

* cited by examiner

*Primary Examiner* — Kevin Kim
(74) *Attorney, Agent, or Firm* — Rosenberg, Klein & Lee

(57) ABSTRACT

Systems and methods are provided for human activity analysis and localization using channel state information (CSI). A streamlined data processing and feature extraction approach that addresses concept drifts for time series data is provided. Data obtained from CSI or any other mechanism is used to estimate the wireless channel between two different wireless nodes (e.g., an access point (AP) and an associated station (STA)), and can be used to train a robust system capable of performing room level localization. A phase and magnitude augmented feature space along with a standardization technique that is little affected by drifts is also used.

14 Claims, 12 Drawing Sheets

| Round | Baseline | | MyFi | |
|---|---|---|---|---|
| | Accuary | F1 Score | Accuary | F1 Score |
| 1 | 51.22% ± 17 | 43.64% ± 16 | 77.97% ± 7 | 77.36% ± 8 |
| 2 | 75.73% ± 6 | 74.05% ± 7 | 76.09% ± 3 | 76.17% ± 2 |
| 3 | 89.73% ± 5 | 89.92% ± 4 | 82.37% ± 9 | 82.18% ± 9 |
| 4 | 84.69% ± 2 | 83.17% ± 4 | 82.00% ± 6 | 82.09% ± 6 |
| 5 | 77.61% ± 1 | 75.46% ± 27 | 78.58% ± 7 | 79.13% ± 6 |
| Mean | 75.80% ± 6 | 75.25% ± 12 | 79.40% ± 6 | 79.39% ± 6 |

Apt 4a

| Round | Baseline | | MyFi | |
|---|---|---|---|---|
| | Accuary | F1 Score | Accuary | F1 Score |
| 1 | 48.32% ± 1 | 33.58% ± 1 | 71.48% ± 6 | 69.35% ± 6 |
| 2 | 53.71% ± 6 | 43.43% ± 8 | 81.45% ± 4 | 81.00% ± 4 |
| 3 | 59.01% ± 8 | 49.09% ± 13 | 74.92% ± 1 | 74.63% ± 6 |
| 4 | 52.27% ± 11 | 48.27% ± 11 | 73.24% ± 8 | 72.65% ± 7 |
| 5 | 63.05% ± 10 | 58.94% ± 11 | 77.11% ± 3 | 74.64% ± 6 |
| 6 | 53.95% ± 13 | 45.59% ± 13 | 77.65% ± 7 | 77.39% ± 7 |
| Mean | 55.05% ± 8 | 46.48% ± 10 | 75.98% ± 5 | 74.94% ± 6 |

Apt 4b

| Round | Baseline | | MyFi | |
| --- | --- | --- | --- | --- |
| | Accuary | F1 Score | Accuary | F1 Score |
| 1 | 61.95% ± 18 | 55.66% ± 22 | 88.98% ± 4 | 88.89% ± 4 |
| 2 | 60.71% ± 19 | 54.25% ± 24 | 85.57% ± 6 | 85.27% ± 6 |
| 3 | 69.80% ± 13 | 63.3% ± 16 | 83.53% ± 6 | 82.88% ± 7 |
| 4 | 75.58% ± 13 | 70.79% ± 17 | 89.09% ± 5 | 89.08% ± 5 |
| 5 | 66.99% ± 17 | 61.75% ± 20 | 84.50% ± 8 | 84.19% ± 9 |
| 6 | 66.73% ± 14 | 60.63% ± 17 | 85.50% ± 7 | 85.23% ± 7 |
| 7 | 67.57% ± 12 | 60.48% ± 13 | 86.86% ± 6 | 86.80% ± 6 |
| 8 | 72.88% ± 6 | 65.51% ± 8 | 87.52% ± 5 | 87.57% ± 5 |
| 9 | 66.91% ± 11 | 60.12% ± 13 | 89.35% ± 5 | 89.22% ± 6 |
| 10 | 55.06% ± 9 | 43.78% ± 12 | 90.11% ± 4 | 90.18% ± 4 |
| 11 | 71.21% ± 11 | 65.13% ± 14 | 90.46% ± 4 | 90.47% ± 4 |
| 12 | 73.28% ± 12 | 67.28% ± 16 | 89.65% ± 5 | 89.47% ± 6 |
| 13 | 78.15% ± 10 | 73.24% ± 13 | 90.30% ± 4 | 90.29% ± 4 |
| 14 | 75.23% ± 9 | 69.03% ± 12 | 86.51% ± 5 | 86.47% ± 5 |
| 15 | 66.12% ± 7 | 57.99% ± 8 | 87.62% ± 5 | 87.60% ± 5 |
| 16 | 67.88% ± 11 | 61.34% ± 12 | 89.13% ± 5 | 89.10% ± 5 |
| 17 | 68.19% ± 14 | 62.45% ± 17 | 86.84% ± 6 | 86.67% ± 7 |
| 18 | 56.78% ± 11 | 48.57% ± 13 | 89.12% ± 6 | 89.01% ± 6 |
| 19 | 63.79% ± 13 | 55.28% ± 16 | 87.38% ± 5 | 87.32% ± 5 |
| 20 | 73.94% ± 11 | 69.32% ± 13 | 90.85% ± 4 | 90.80% ± 4 |
| 21 | 68.25% ± 10 | 59.65% ± 13 | 90.12% ± 4 | 90.09% ± 4 |
| 22 | 70.45% ± 39 | 66.33% ± 39 | 87.52% ± 5 | 87.40% ± 6 |
| 23 | 62.33% ± 12 | 52.52% ± 14 | 89.28% ± 5 | 89.14% ± 5 |
| Mean | 67.82% ± 13 | 61.06% ± 16 | 88.08% ± 5 | 87.96% ± 5 |

Apt 4c

FIG. 6D

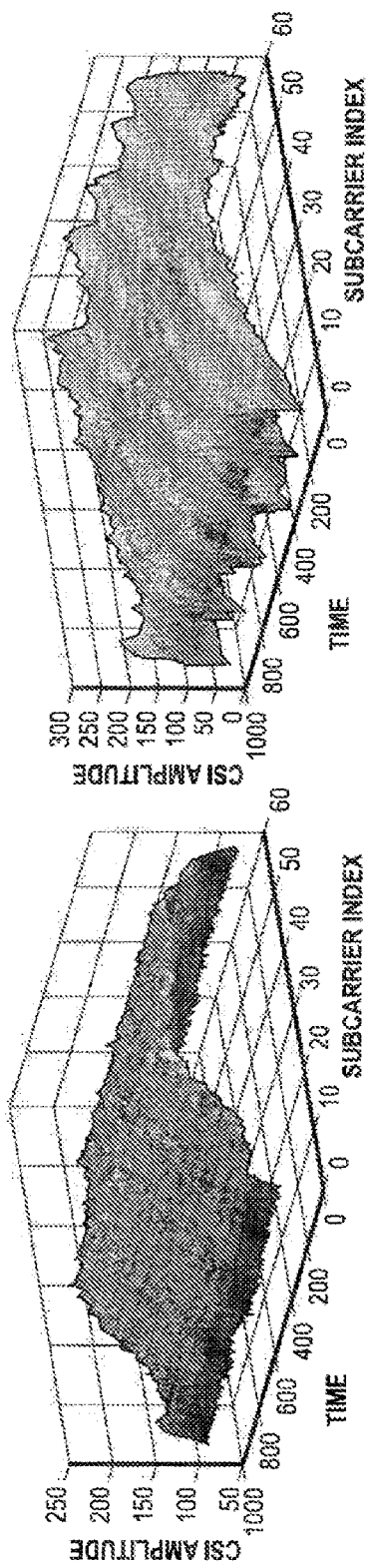
FIG. 7A
FIG. 7B
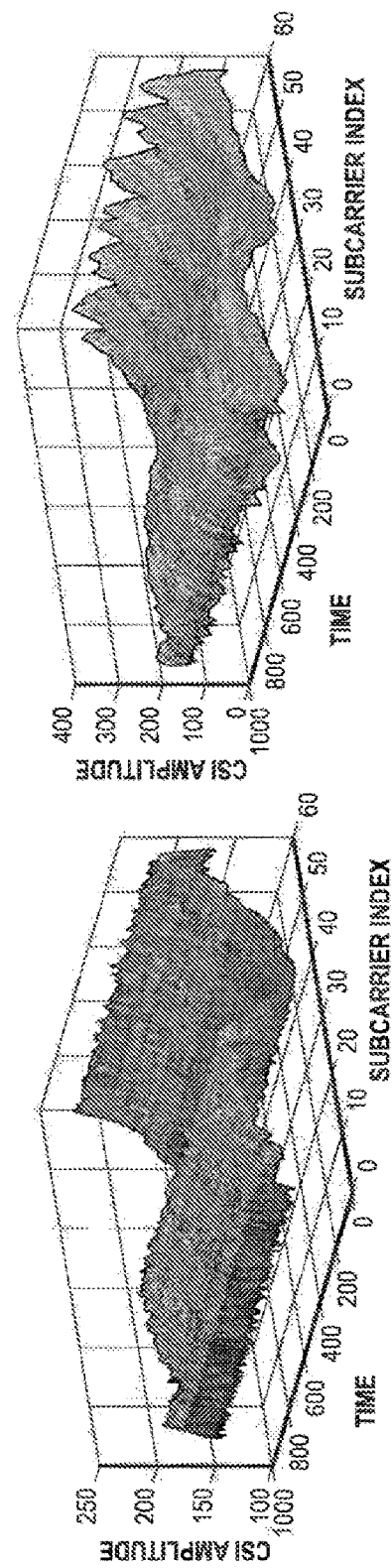
FIG. 8A
FIG. 8B

| Datasets | Features (Magnitude) | | | Features (Phase) | | | Augmented Features | | |
|---|---|---|---|---|---|---|---|---|---|
| | SVM | RF | Inc. SVM | SVM | RF | Inc. SVM | SVM | RF | Inc. SVM |
| Apt 1 | 77.94 | 59.84 | 54.85 | 55.09 | 46.04 | 38.92 | 80.52 | 60.31 | 70.67 |
| Apt 2 | 90.2 | 87.8 | 67.26 | 78.8 | 88.67 | 74.33 | 92.0 | 89.8 | 75.12 |
| Apt 3 | 78.24 | 60.5 | 35.6 | 32.95 | 36.12 | 38.3 | 74.53 | 63.95 | 83.35 |

FIG. 13

HANDLING CONCEPT DRIFT IN WI-FI-BASED LOCALIZATION

CROSS-REFERENCE TO RELATED APPLICATIONS

The patent application claims the priority benefit of priority from U.S. patent application Ser. No. 17/383,654 filed Jul. 23, 2021; which claims the benefit of priority as a 371 National Phase Entry application of PCT/IB2020/051503 filed Feb. 22, 2020; which itself claims the benefit of priority from U.S. Provisional Patent Application 62/809,011 filed Feb. 22, 2019 and U.S. Provisional Patent Application 62/809,388 filed Feb. 22, 2019; the entire contents of each being incorporated herein by reference.

FIELD OF THE INVENTION

The present disclosure is generally related to wireless infrastructure to locate a moving target passively and more particularly, the changes in wireless signals due to motion and handling of concept drift using representation learning.

BACKGROUND OF THE INVENTION

Motion detection is the process of detecting a change in the position of an object relative to its surroundings or a change in the surroundings relative to an object. Motion detection is usually a software-based monitoring algorithm which, for example when it detects motions will signal toc surveillance camera to begin capturing the event. An advanced motion detection surveillance system can analyze toe type of motion to see if it warrants an alarm. Wi-Fi location determination, also known as Wi-Fi localization or Wi-Fi location estimation refers to methods of translating observed Wi-Fi signal strengths into locations. The valuable information gained from indoor localization is essential to enabling any location-based applications, such as intrusion detection, elderly care, home automation, and more.

Indoor activity monitoring and localization approaches can be organized into two categories: device-based active systems and device-free passive systems. Device-based approaches locate a target by pinpointing the device they carry. The target participates actively in the monitoring process by carrying a sensing device, such as a smartphone or radio-frequency identification (RFID) tag, at all times. While these approaches can achieve decimeter-level resolution, compliance is difficult and often impractical (e.g., in use cases such as intrusion detection). In contrast, device-free approaches do not impose such constraint and locate target passively by observing changes in the environment. These changes are associated with locations of interest during the training phase, building an ensemble of fingerprints. Then, during the testing phase, fingerprints generated from new data are compared with those from training data to determine the location. Recent studies show that device-free localization can achieve meter-level resolution.

Wireless signals are sensitive to many internal and external factors such as noise, interference, attenuation, and changes in the physical environment (e.g., moving furniture). These factors, collectively referred as "drift," result in inconsistencies in the raw measurement, even when observing signals between two stationary devices in a motion-free environment. The statistical properties of the raw data change over time in unforeseen ways. Concept drift can occur gradually (e.g., due to path loss) or abruptly (e.g., due to device rebooting).

SUMMARY OF THE INVENTION

Embodiments of the present invention allow for robust device-free localization and activity monitoring in smart indoor environments and handling concept drift. Wireless signals may be used for room-level localization baseline operated to create robust and consistent data processing and feature extraction. Supervised machine learning or artificial intelligence may be executed, which utilizes computed statistical features to generate respective decision boundaries and make predictions. An unsupervised machine learning algorithm may be executed, which introduces a smart correction algorithm that improves the accuracy and consistency of room-level location prediction. A majority voting algorithm may be used for error correction to introduce a smart correction algorithm that improves the accuracy and consistency of room-level location prediction. The system maps original data into an augmented space where the temporal inconstancies will not affect location models. The system further uses unsupervised methods for discovering clusters of distinguishable locations within sensing area. The system further uses incremental machine learning framework since this allows the input data to continuously extend the existing knowledge of the model. The system further uses convolution neural network framework to project different CSI streams as RGB channels to model locations within sensing area. The system further uses recurrent neural network framework to automatically learn short long term dependency of CSI data for tracking the location of a walking user within sensing area.

BRIEF DESCRIPTION OF THE DRAWINGS

FIGS. 6A-D illustrate exemplary performance evaluation comparisons of F score of the location identification at different time intervals with and without knowledge-based feature fusion solution for a sensing area.

FIGS. 7A-B illustrate exemplary measurements of CSI signal magnitudes.

FIGS. 8A-B illustrates exemplary measurements of CSI signal magnitudes, repeating the data collection after an extended period.

FIG. 13 illustrates an exemplary performance evaluation comparison of the location identification at different time intervals.

DETAILED DESCRIPTION

Systems and methods are provided for human activity analysis and localization using channel state information (CSI). A streamlined data processing and feature extraction approach that addresses concept drifts for time series data is provided. Data obtained from CSI or any other mechanism is used to estimate the wireless channel between two different wireless nodes (e.g., an access point (AP) and an associated station (ST A)), and can be used to train a robust system capable of performing room level localization. A phase and magnitude augmented feature space along with a standardization technique that is little affected by drifts is also used.

Figure 1:
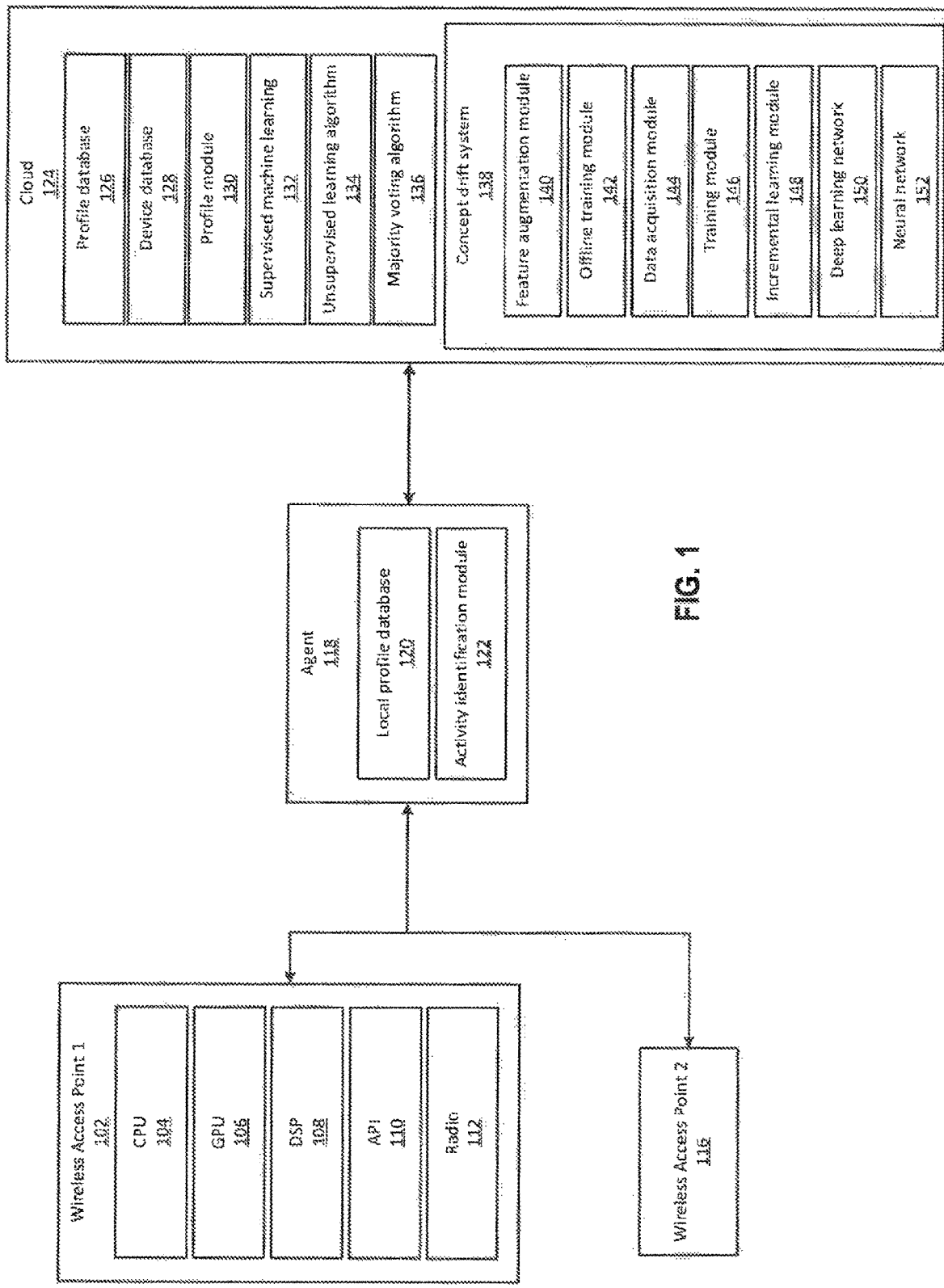
FIG. 1 illustrates an exemplary network environment in which a system for managing concept drift in Wi-Fi-based localization.

FIG. 1 illustrates an exemplary network environment in which a system for managing concept drift in Wi-Fi-based localization. Such a network environment allows for device-free individual localization and activity monitoring within a defined (e.g., indoor) environment. Such localization and activity' monitoring may be achieved by analyzing wireless signals. Such analysis may utilize artificial intelligence to continually refine and improve results over time.

In an embodiment, the wireless access point 102 is a Wi-Fi access point. In an embodiment, the wireless access point 102 is an 802.11h NIC-equipped access point. The wireless transceiver of the wireless access point 102 is in communication with the further stationary' device over a corresponding further one of the at least one radio frequency communication link. The wireless access point 102 is configured to record a further channel state information data set for the further one of the at least one radio frequency communication link at a corresponding time. In an embodiment, the determining the activity of the person in the environment includes determining the activity of the person in the environment based on a comparison of the further channel state information data set to each of the at least one channel state information profile of each of the plurality of activity profiles. In an embodiment, the activity' is determined based on a sum of a similarity measurement of the channel state information data set, and a similarity measurement of the further channel state information data set. A central processing unit (CPU) 104 is the electronic circuitry within a computer that carries out the instructions of a computer program by performing the basic arithmetic, logic, controlling and input/output (I/O) operations specified by the instructions, A graphics processing unit (GPU) 106 is a specialized electronic circuit designed to rapidly manipulate and alter memory to accelerate the creation of images in a frame buffer intended for output to a display device. GPUs 106 are used in embedded systems, mobile phones, personal computers, workstations, and game consoles. Modem GPUs are very efficient at manipulating computer graphics and image processing. Their highly parallel structure makes them more efficient than general-purpose CPUs for algorithms that process large blocks of data in parallel. A digital signal processor (DSP) 108 is a specialized microprocessor (or a SIP block), with its architecture optimized for the operational needs of digital signal processing. DSP 108 may be configured to measure, filter, or compress continuous real-world analog signals. An application program interface (API) 110 is a set of routines, protocols, and tools for building software applications. Basically, an API 110 specifies how software components interact. Additionally, APIs are used when programming graphical user interface (GUI) components. The API 110 in this invention provides access to the channel state data to the agent 118. An access point compliant with either 802.11b or 802.11g, using the stock omnidirectional antenna, might have a range of 100 m (0.062 mi). The same radio with an external semi-parabolic antenna (15 dB gain) with a similarly equipped receiver at the far end might have a range over 20 miles. A network interface controller (MC) 114—also known as a network interface card, network adapter, LAN adapter or physical network interface, and by similar terms—is a computer hardware component that connects a computer to a computer network.

A second wireless access point 116 is a Wi-Fi access point. In an embodiment, the second wireless access point 116 is an 802.11h NIC-equipped access point The wireless transceiver of the second wireless access point 116 is in communication with the further stationary device over a corresponding further one of the at least one radio frequency communication link. The second wireless access point 116 is configured to record a further channel state information data set for the further one of the at least one radio frequency communication link at a corresponding time. In an embodiment, determining the activity of the person in the environment may be based on a comparison of the further channel state information data set to each of the at least one channel state information profile of each of the plurality of activity profiles. The activity may be determined based on a sum of a similarity measurement of the channel state information data set and a similarity measurement of the further channel state information data set.

An agent 118 is a device or module configured to collect data from the Wi-Fi chipset, filter the incoming data, then feed and pass it to the cloud server 124 for activity identification. Depending on the configuration, the activity identification can be done on the edge, at the agent level, in the "cloud" (e.g., cloud server 124), or some combination of the two. A local profile database 120 is utilized when at least a portion of the activity identification is done on the edge. This could be a simple motion/no-motion determination profile, or a plurality of profiles for identifying activities, objects, individuals, biometrics, etc. An activity identification module 122 distinguishes between walking activities and in-place activities. In general, a walking activity causes significant pattern changes of the CSI amplitude over time, since it involves significant body movements and location changes. In contrast, an in-place activity (e.g. watching TV on a sofa) only involves relatively smaller body movements and will not cause significant amplitude changes, but presents certain repetitive patterns within the CSI measurements.

A cloud server 124 may analyze and create profiles describing various activities. A profile database 126 may be utilized when at least a portion of the activity identification is done in the cloud server 124. This could be a simple motion/no-motion determination profile or a plurality of profiles (i.e., for identifying activities, objects, individuals, biometrics, etc.). A device database 128 may store the device ID of all connected wireless access points. A profile module 130 may monitor the data set resulting from continuous monitoring of a target environment so as to identify multiple similar instances of an activity without a matching profile in such a data set, combine that data with user feedback, and label the resulting clusters to define new profiles that are then added to the profile database 126. A supervised machine learning module 132 may operate in conjunction with the proposed data transformation to obtain a mapping between extracted features of wireless signals and areas of interest in the environment. An unsupervised learning algorithm 134 may be executable to introduce a smart correction algorithm that improves the accuracy and consistency of room-level location prediction. A majority voting algorithm 136 for error correction may be executable to introduce a smart correction algorithm that improves the accuracy and consistency of room-level location prediction.

A concept drift system 138 handles the unwanted shift in the learned boundaries of the output space. The concept drift system 138 includes a feature augmentation module 140, an offline training module 142, a data acquisition module 144, a training and validation module 146, an incremental learning module 148, an analysis of deep learning network 150 and a deep convolution neural network 152, described further below.

The data collection procedure is done from apartments of three different sizes with different layouts (e.g., layout: data sets 501, 502, 503). Two different devices are used for the experiments, namely, the Tx and the Rx which corresponds to the routers for transmission and the reception, respectively. Both of the devices are placed further apart in the apartment and the experiment begins by taking an empty capture at the first instance. This empty capture corresponds to no motion at any of the rooms in the apartment. A 1-minute data is captured by allowing the subject to walk in each of the rooms of the apartment to obtain the annotated data. The data is then collected and processed and converted to the augmented feature space as described in the following sections. In order to validate whether walking in different rooms of an indoor space correspond to distinguishable clusters from Wi-Fi propagation perspective, an unsupervised clustering analysis is done over the dataset to evaluate our location partitioning.

Figure 2:
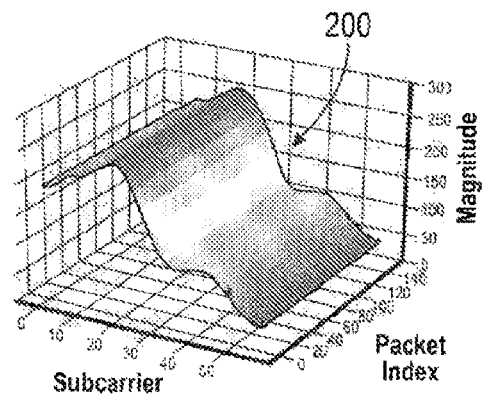
FIG. 2 illustrates exemplary measurements of CSI signal magnitudes.
Figure 2:
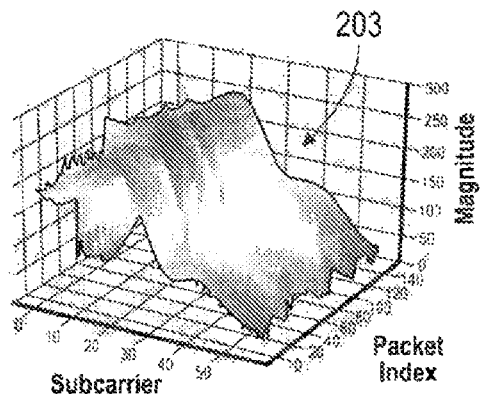
Figure 2:
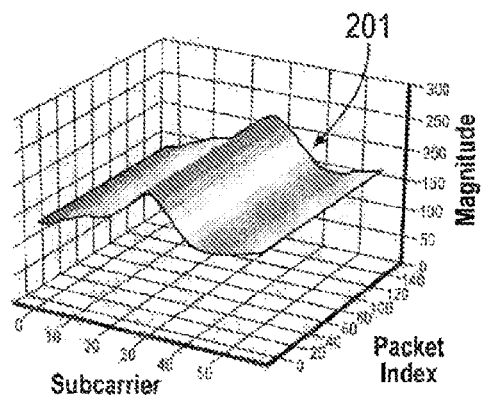
Figure 2:
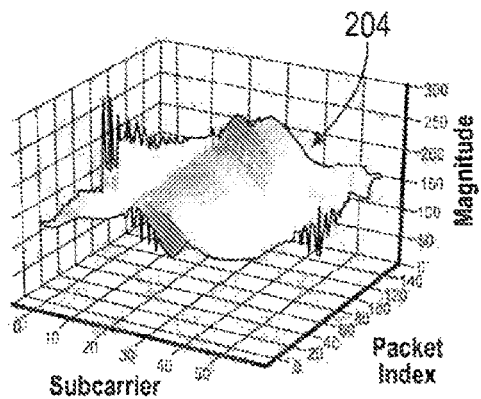
Figure 2:
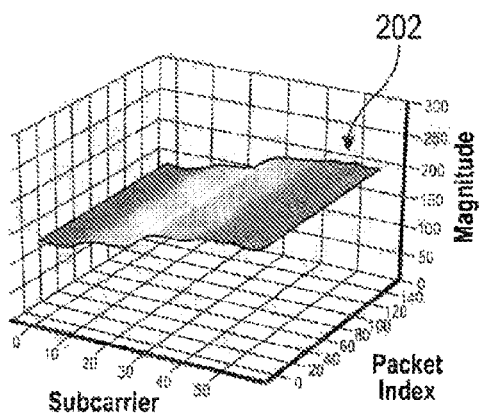
Figure 2:
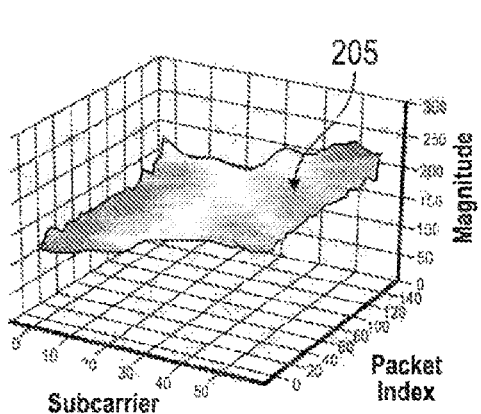

An incremental learning module 148 is presented based on the proposed feature space. This framework allows the input data to continuously extend the existing knowledge of the model. Deep learning has been used recently for indoor localization with Wi-Fi CSI data. Existing techniques perform active localization by training a restricted Boltzmann machine (RBM) layer by layer or use convolution neural network (CNN) in order to perform the online training phase. Deep convolution neural network applies convolution operations to an input image in order to extract essential features that are embedded in the training set. A non-linear activation function is applied followed by the convolution operation that is performed at each layer of network. FIG. 2 illustrates exemplary measurements of CSI signal magnitudes. Each graph 200-205 in FIG. 2 represents a segment of CSI data that has been selected from the same transmitter-receiver antenna pair and captured for two different sub-regions within a sensing area while walking in a sensing area on three different days. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

CSI data collected at the same area of interest, between the same transmitter-receiver antenna pair (stream), at three different time instances. For each time instance, this includes CSI collected while the environment is empty (i.e., no motion) in graphs 200, 201, and 202 to illustrate the effect of human motion on the received frequency response and CSI collected with the presence of motion in graphs 203, 204, and 205. CSI magnitude over time show's very little variation when there is no human motion; the opposite is true when one begins walking and CSI magnitude over frequency takes drastically different shape on different days, even when observing between the same transmitter-receiver antenna pair between two stationary devices in a motion-free environment.

Changes in CSI magnitude is a result of multi-path fading. When signals bounce off surfaces of different materials (e.g., metal or glass), the scattering leads to a phenomenon where multiple copies of the signal arrive at the receiver along different paths. As they arrive at the receiver, these copies are combined either constructively or destructively, resulting in an amplified or attenuated signal power. Furthermore, since the effect of multi-path depends on the phases of signals, they are frequency selective and small changes in path length can alter the characteristics of the received signal. This observation confirms that directly using raw or filtered CSI as training data would lead to prediction deterioration, since the statistical properties of the received wireless signal would vary significantly over time, frequency, and stream. Thus, the second objective is to transform CSI data in such a way that feature mapping is resilient to multi-path fading and scattering over long period of time.

As any fingerprinting approach, the proposed localization process is divided into an offline training phase and an online testing phase. In practice, it implies that the end user is involved in the initial setup and data collection process as a means to obtain labeled data at each area of interest. This assumption is acceptable since it gives the user the flexibility to define where in the apartment they want to be tracked. As time passes, drift occurs in the distribution of input features, either gradually or abruptly. Management of concept drift formalizes a mapping of raw CSI data to a feature space such that the distribution of feature importance remains consistent enough to withhold changes due to temporal or physical changes in the environment.

Figure 3:
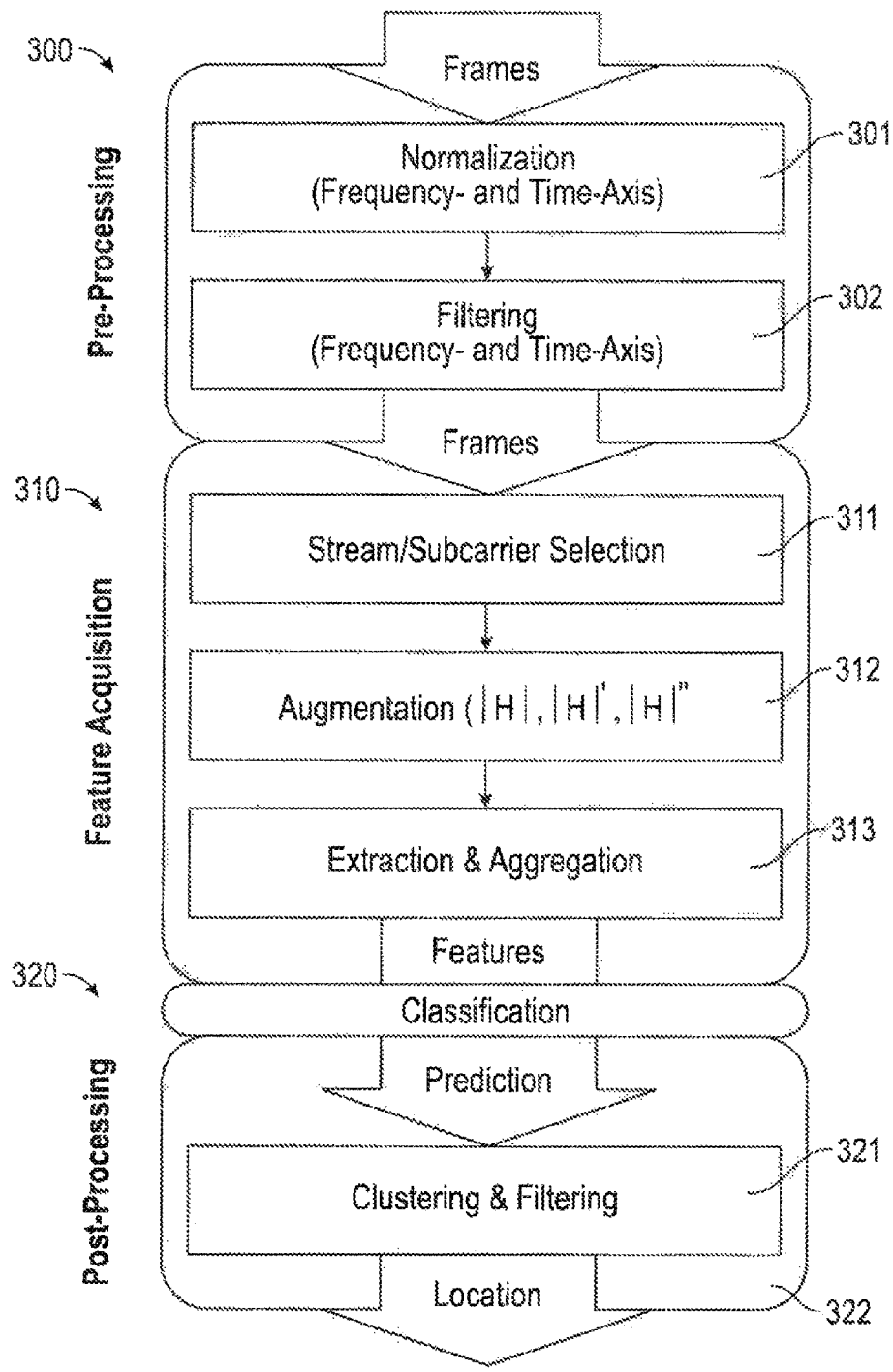
FIG. 3 is a flowchart illustrating an exemplary method for managing concept drift in Wi-Fi-based localization.

FIG. 3 is a flowchart illustrating an exemplary method for managing concept drift in Wi-Fi-based localization. Different portions of the method are respectively associated with pre-processing module 300, feature acquisition module 310, and post-processing module 320.

With respect to the pre-processing module 300, while CSI provides finer granularity than coarse-grained RSSI, it is nonetheless prone to noise from many internal and external sources. In order to reliably track meaningful variation and extract good statistical features from CSI data, this module prepares each data frame with noise removal and normalization. Pre-processing module 300 comprises at least data preparation along subcarrier-axis 301 unit and data preparation along frequency-axis 302 unit.

With respect to data preparation along subcarrier-axis 301, the magnitude in different streams can take values in different dynamic ranges. Likewise, the values of different subcarriers within each stream can also shift and scale over time. To overcome these temporal instabilities due to power fluctuation, fixed-score scaling normalization and digital filtering techniques can be applied to standardize and smoothen the magnitude of each stream along the subcarrier-axis. As a working example, the L2-norm of the CSI vector is calculated to re-scale the values to a predefined reference range. Then, a Savitzky-Golay filter is applied for each stream-subcarrier pair in the observation window.

With respect to data preparation along frequency-axis 302, given a certain extent of variation of measured CSI, it is often difficult to determine whether the variation stems from motion in an area or due to temporal power dynamics.

To ensure that magnitude at each stream and subcarrier is adjusted to a common scale, similar normalization and digital filtering techniques as data preparation 301 are adopted in the time-axis. As an example, a Savitzky-Golay filter, follow by mean normalization, is applied for each stream-subcarrier pair in the observation window.

The feature acquisition module 310 obtains relevant statistical properties that are representative for a given area of interest and, more importantly, remain consistently representative for that area over long period of time. Feature acquisition module 310 comprises at least stream and subcarrier selection 311—unit, data augmentation 312 unit, and feature extraction and aggregation 313 unit.

Since adjacent subcarriers behave similarly, considering all available subcarriers in the channel is redundant and may introduce unnecessary complexity due to fading. Thus, a fixed number of uniformly spaced frequency bands are pre-selected from the available subcarriers via stream and subcarrier selection 311. However, since multi-path fading is frequency selective, it is possible that some of the pre-selected subcarriers are severely affected. To factor in this possibility, both the magnitude of the pre-selected subcarriers and those of their neighbors are considered in tire final selection process. Stream and subcarrier selection 311 is an instance of sub-sampling, a technique for preventing over-fitting to low-level features. Sub-sampling also leads to less computation in later stages of the pipeline.

In addition to original data frame II H II, other variations of II H II are calculated to obtain an augmented input space. Data augmentation 312 transforms the input data in such a way that a more complete and more descriptive feature set can be extracted from each data frame. The augmented input can encompass many variations, including but not limited to:

‖H‖: The original frame;
‖H‖': The first derivative of ‖H‖ with respect to packet index; and
‖H‖": The second derivative of ‖H‖ with respect to packet index.

The proposed feature extraction and aggregation 313 strategy is categorized in threefold, defined by the axes along which a statistical feature is computed and aggregated.

The strategy derives from different assumptions made regarding the effects motion has on the magnitude of CSI within an observation window. Arrows represent the direction in which the feature is averaged.

As a real-time system, this post-processing module 320 introduces an extra layer of processing to filter out outliers in a continuous stream of predictions. Post-processing module 320 comprises at least clustering 321 unit and majority vote 322 unit.

If the supervised learner can output probability of each class given an input, the probability can be further fed into an unsupervised learner, such as K-Means clustering 321. This additional step accounts for the fact that some areas of interest may be ill-defined (areas being too close and similar in CSI profile) and thus are consistently getting mixed. Since the areas of interest are defined by the user prior to localization, the number of clusters is fixed.

Majority vote 322 is another example of solution for smart correction of predicted location clusters, which includes a proposed voting filter finding the majority element (i.e., the mode) within a fixed-size observation window. Since a person cannot spasmodically appear in two or more rooms within a short period of time, the filter leverages current and previous predictions to eliminate outlier predictions and achieve a more stable stream of outputs.

Figure 4:
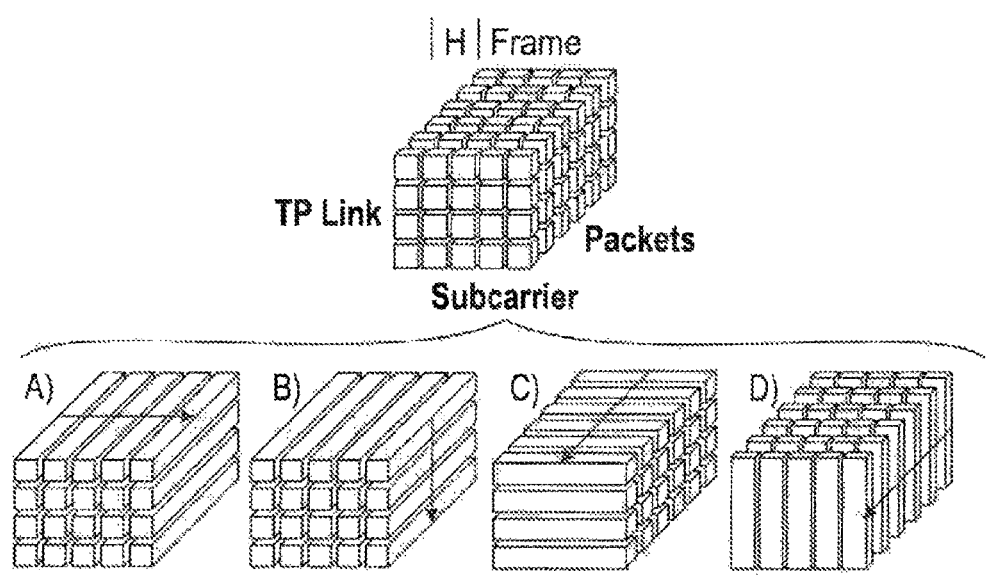
FIG. 4 is a schematic representation illustrating an exemplary general feature extraction strategy as categorized by the axes along which a statistical feature is computed.

FIG. 4 is a schematic representation illustrating an exemplary general feature extraction strategy as categorized by the axes along which a statistical feature is computed. Strategy A and B assume that motion creates identifiable features over time. Similarly, strategy C and D assume that motion causes identifiable changes over multi-paths and frequency bands, respectively. Thus, each statistical feature x is calculated along one axis, and then averaged along a different axis: Extract feature x along packet-axis; then average x over stream to obtain s features.

Extract feature x along packet-axis; then average x over subcarrier to obtain c features.

Extract feature x along stream-axis; then average x over packets to obtain s features. Extract feature x along subcarrier-axis; then average x over packets to obtain c features.

The proposed statistical feature set includes but not limited to mean, variance, skewness, and kurtosis.

A supervised learner is required to obtain a mapping between extracted feature from CSI and areas of interest in the environment. As a working example, Random Forest is used to perform the classification task.

Areas of interest are user-defined and can be arbitrary in number, size, or shape. A logical division could he to define an area as a room (e.g., bedroom, bathroom) or any space in the apartment where tracking may be wanted (e.g., entrance, balcony). Nevertheless, definition can be finer-grained than room-level, such as "on the couch" or "in the reading chair".

Figure 5:
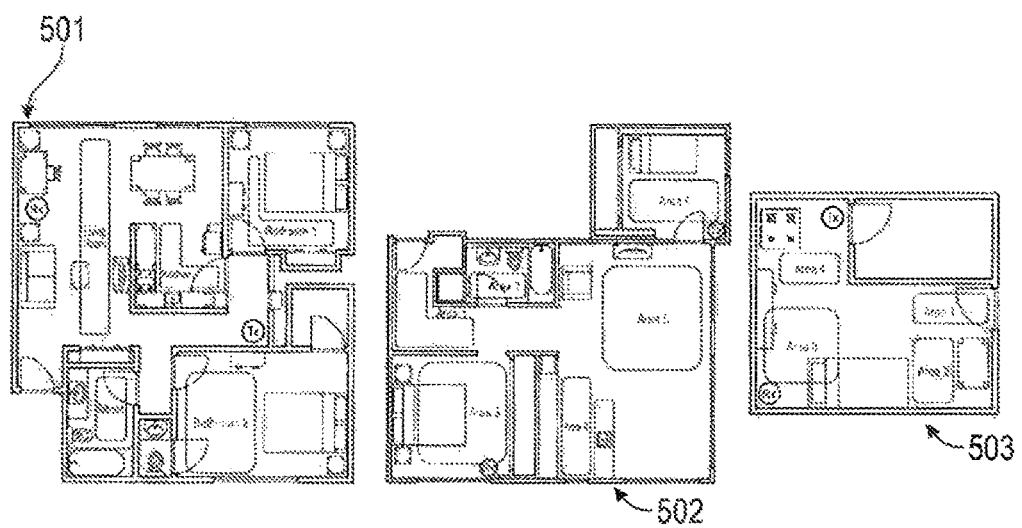
FIG. 5 is an exemplary map of device placement within a residential apartment.
Figures 6A, 6B, 6C:
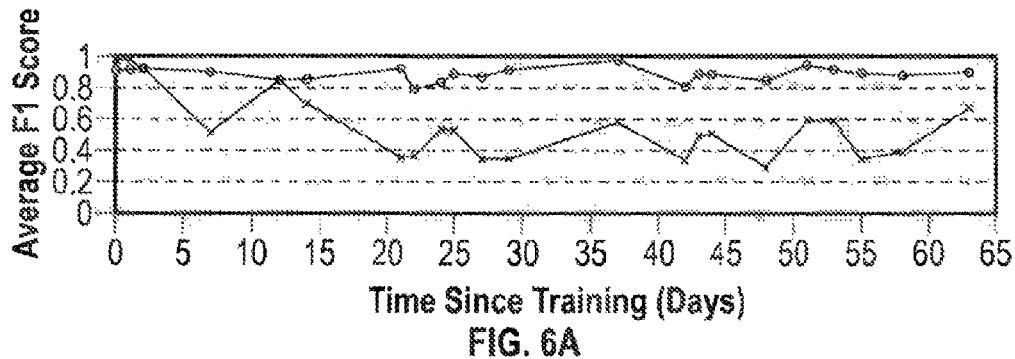

FIG. 5 is an exemplary map of device placement within a residential apartment. Specifically, FIG. 5 shows the layout of the three apartments in which the experiments were conducted to obtain layout data sets 501, 502, and 503. A pair of NIC-equipped devices (one transmitter and one receiver) is installed in each apartment. The floor plans for each apartment, including the locations of the transmitter and the receiver as well as the areas of interest are depicted. The training phase involves collecting CSI data during a 1-minute walk at each area of interest. With a sampling rate of fifteen packets per second, it translates to around 900 packets per area. Since all data were collected in non-lab-controlled settings, the exact state of the environment during those processes is difficult to measure and document. Factors such as network condition, furniture arrangement, or even motion from neighboring apartments (since Wi-Fi signals can propagate through walls) can have an influence on the behavior of the devices and, consequently, the raw CSI measurements.

Localization performance is validated in the form of K-fold cross-validation, where collected data are divided by the time of collection and K equals the number of rounds conducted in the test environment. However, whereas in traditional K-fold cross-validation, 1-fold is selected for testing and tire remaining k–1 folds for training, the described method does the inverse. The validation method coincides with the design philosophy for offering a pragmatic solution to indoor localization using minimum number of commercial off-the-shelf devices, in which case the user is only required to train the model once to accommodate for different environments.

In order to validate whether—walking in different rooms of an indoor space correspond to distinguishable clusters from Wi-Fi propagation perspective, an unsupervised clustering analysis is done over the dataset to evaluate our location partitioning. From the elbow analysis of the unsupervised clustering il was found that Wi-Fi mesh distortions can also be categorized in an unsupervised manner, where the number of clusters correspond to walking or physical activities in number of areas in the apartment.

A similarly structured baseline solution is implemented for comparison. The baseline system implements the same pre-processing and post-processing steps. Overall, it represents a naive model that assumes motion only affects the channel response along the packet-axis. Under this assumption, each CSI value is treated as an independent entity.

In addition to accuracy, F1 score is used to evaluate and compare the performance of a baseline system with a system where concept drift is managed. F1 score is a standard performance metric and is the weighted average of precision and recall. For binary classification, the F1 score is defined as:

$$F1 = 2 \times (\text{precision} \times \text{recall}) / (\text{precision} + \text{recall})$$

For multi-class classification, a score is calculated for each class. Then, scores from all classes are averaged to obtain the final F1 score.

FIGS. 6A-D illustrate exemplary performance evaluation comparisons of F score of the location identification at different time intervals with and without knowledge-based feature fusion solution for a sensing area. As illustrated in FIGS. 6A-D, performance may be compared in terms of accuracy and F1 score, as well as between the baseline and managed concept drift systems. Empirical results show that while baseline achieves a high F1 score in the beginning, its performance quickly deteriorates as time passes. Managing concept drift, however, maintains a consistently high F1 score. Regardless whether concept drift occurs abruptly or gradually, the sampled CSI passes through the same data processing and feature extraction pipeline. The time-dependent statistical drift in channel state is overcome without needing to adjust the model itself at run-time.

FIGS. 7A-B illustrate exemplary measurements of CSI signal magnitudes. In order to illustrate a frequency response of a Wi-Fi channel, the CSI amplitudes are captured over 60 seconds (with sample rate of 20 packets/second). FIG. 7A shows the empty capture (i.e., a capture with no motion), and FIG. 7B shows a capture with walking activity in a room.

FIGS. 8A-B illustrates exemplary measurements of CSI signal magnitudes, repeating the data collection after an extended period. Specifically, FIG. 8A is an illustration of exemplary measurements of CSI signal magnitudes, repeating the data collection after an extended period, according to various embodiments. FIG. 8B shows a similar capture taken after 9 hours. These figures illustrate the effect of drift on the Wi-Fi mesh, both for empty and walking captures. These changes in distribution of the data along the feature space provide an example of what is referred to as concept drift.

A new robust feature space may be constructed that is less affected by drift. Such construction may start with a received signal strength indicator (RSSI) drops filter. This filter looks at the successive packets and measures sudden peaks for RSSI values. These peaks can be results of constructive interference from neighboring devices, multipath fading and temporal dynamics. The filter then discards the corresponding packets from the CSI. After discarding the packets based on RSSI corrections, a normalization process for CSI amplitudes are applied to obtain the time series to a predefined range. The L2norm of the CSI vector is then calculated for each of the CSI vectors in order to re-scale their values to the predefined range.

The phase information from the CSI may be extracted and used for feature augmentation. Since the NIC implements a 5 GHZ OFDM channel, the fact that phase difference between successive antennas are stable is utilized. The phase difference between adjunct streams is considered as they correspond to the links from a single transmitter to all 4 of the receiving antennas. A phase correction is then performed for the phases such that their values lie within the range (−p, p). Following these preprocessing, a Hampel filter is used in order to remove the DC component of the phase information and to detrend the phase data. The Hampel filter uses a large sliding window of 300 samples and with a small threshold of 0.01 in order to get the general trend of the data. Once the trend has been computed, it is then removed from the phase difference information. The Hampel filter is then again used with a smaller sliding window of 15 samples and a threshold of 0.01 in order to remove the high frequency noise from the streaming phase data.

Figure 9A:
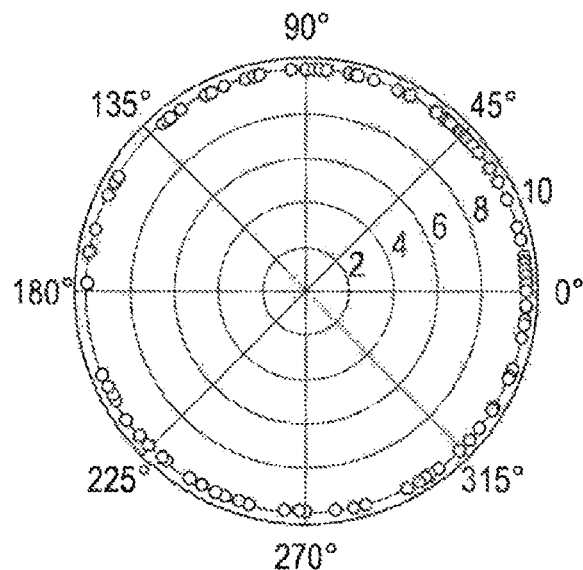
FIGS. 9A-B is a schematic representation of exemplary raw phase information and the phase difference information between successive antennas.
Figure 9B:
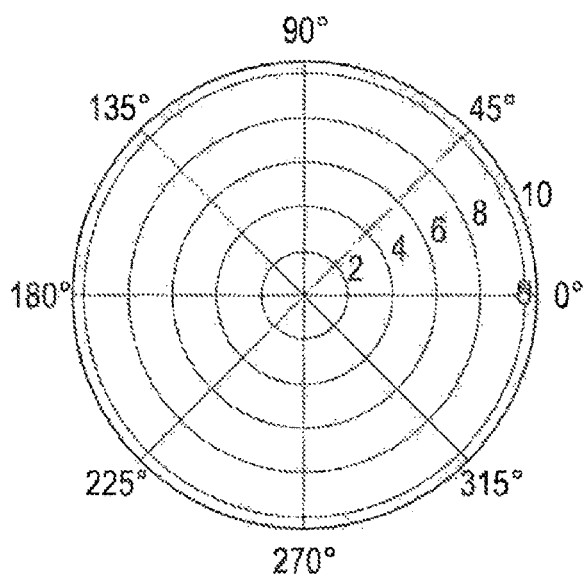

FIGS. 9A-B is a schematic representation of exemplary raw phase information and the phase difference information between successive antennas. As illustrated, the raw phase information has a wider spread and hence is more unstable compared to the phase difference information between successive antennas. FIG. 9A shows the plot for the raw phase information that corresponds to subcarrier 1 and stream 1. FIG. 9B shows the plots for the phase difference between stream 1 and stream 2 which corresponds to the links from a single transmitter and two adjacent receiving antennas.

As an example of the approach, an augmented feature space is illustrated herein, comprising of both phase and magnitude of the Wi-Fi CSI. The feature space includes CSI magnitude for 8 streams and phase difference data from the first four streams (i.e., the phase difference between stream 1, stream 2; stream 2, stream 3; and stream 3, stream 4) are taken. The first 800 packets for all the 56 subcarriers are considered for 4 streams, which results in magnitude information with a cardinality of 56*800*4 whereas for the phase information the data matrix has a cardinality of 56*800*3. The combined feature space F suitable for learning is a 2-D matrix comprising of both phase and magnitude with cardinality 800*392 for each location class (e.g., room). Once the augmented feature space is obtained, a standardization is performed that standardizes the features by removing the mean and scaling to unit variance.

Figure 10A:
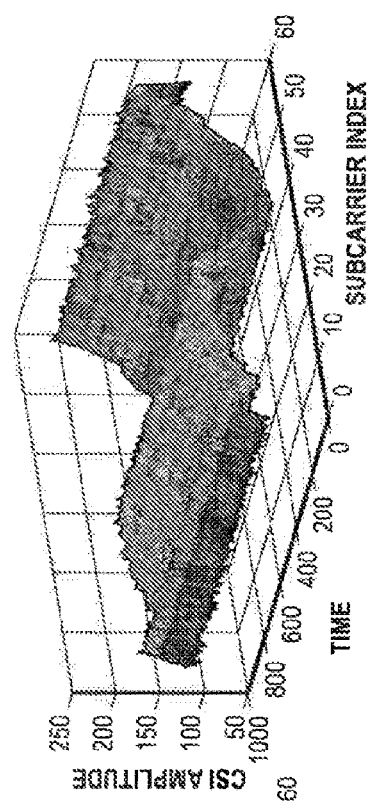
FIGS. 10A-B illustrate exemplary measurements of CSI signal magnitudes captured from empty sensing areas before and after drift.
Figure 10B:
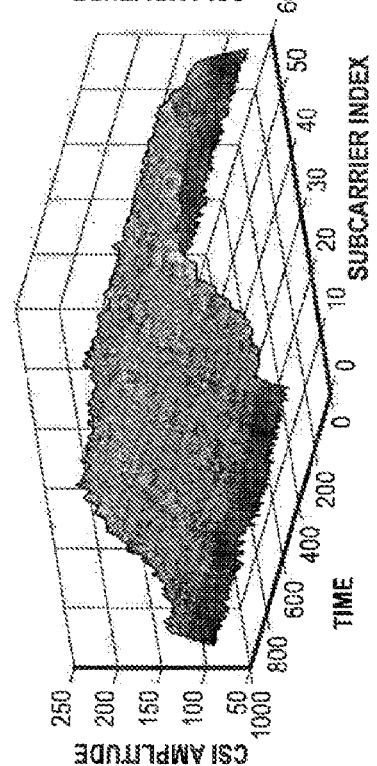

FIGS. 10A-B illustrate exemplary measurements of CSI signal magnitudes captured from empty sensing areas before and after drift. As illustrated, the change in feature space observed when there is a drift, FIG. 10A shows exemplary measurements of CSI signal magnitudes captured from empty sensing areas before drift. FIG. 10B shows exemplary measurements of CSI signal magnitudes captured from empty sensing areas after drift.

Figure 11A:
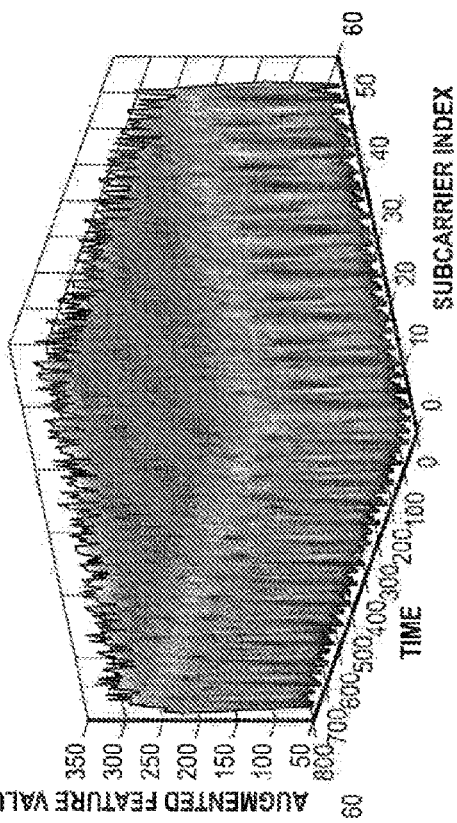
FIGS. 11A-B is a schematic representation of an exemplary augmented feature space that is almost resistant to drifts.
Figure 11B:
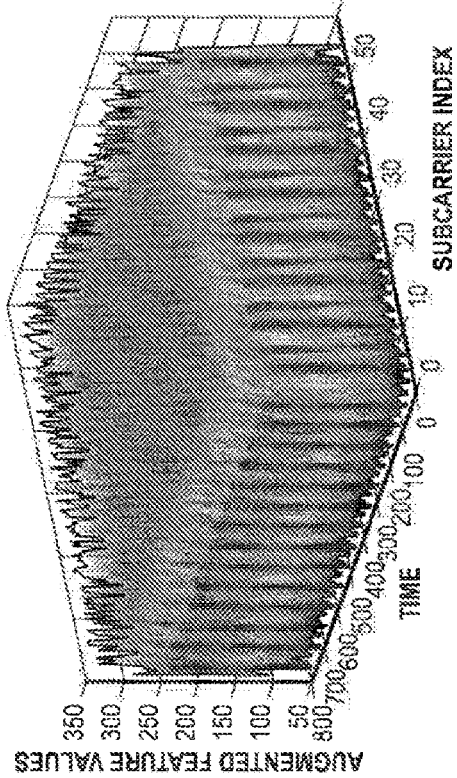

FIGS. 11A-B is a schematic representation of an exemplary augmented feature space that is almost resistant to drifts. An offline training and an online prediction strategy for such a system is provided. Classical machine learning algorithms are used to train on the un-drifted dataset using the augmented features. During testing, the algorithm in tested on the drifted data, which when projected to the combined feature space is least resistant to drifts. Thus, trained models are used for the online prediction of the data that has drifts. The performance of different learning algorithms is compared for training and classification for, a) the case of training only on magnitude data, h) training only on phase data and c) training on the combined data, which represents our most stable feature space.

The data collection procedure is done from apartments of three different sizes with different layouts corresponding to layout data sets 501, 502, and 503. Two different devices are used for the experiments, namely, the Tx and the Rx which corresponds to the routers for transmission and the reception, respectively. Both of the devices are placed further apart in the apartment and the experiment begins by taking an empty capture at the first instance. This empty capture corresponds to no motion at any of the rooms in the apartment. A 1-minute data is captured by allowing the subject to walk in each of the rooms of the apartment to obtain the annotated data.

The data is then collected and processed and converted to the augmented feature space as described in the following sections. For layout data set 501, 5 rounds of data are captured each of which is roughly 30 minutes apart. Although drift is more apparent for measurements taken over longer intervals, for measurements associated with layout data set 501, a channel change is forced by switching off the transmitting device (abrupt drift) before collecting the 5th round. This ensures that a drift has occurred since drifts are expected during a channel change. For layout data set 502, a more rigorous measurement: is performed, and 5 rounds of data are taken, where 3 rounds of data are captured which are 12 hours apart and the last 2 rounds are 2 days apart. For layout data set 502, the measurements are taken in such a diverse manner so that the effect of drift can be thoroughly studied. Finally, for layout data set 503, 3 rounds of data are captured where round 1 and round 2 are data which are 6 hours apart and round 3 is captured at an interval of 12 hours from round 2.

Figure 12:
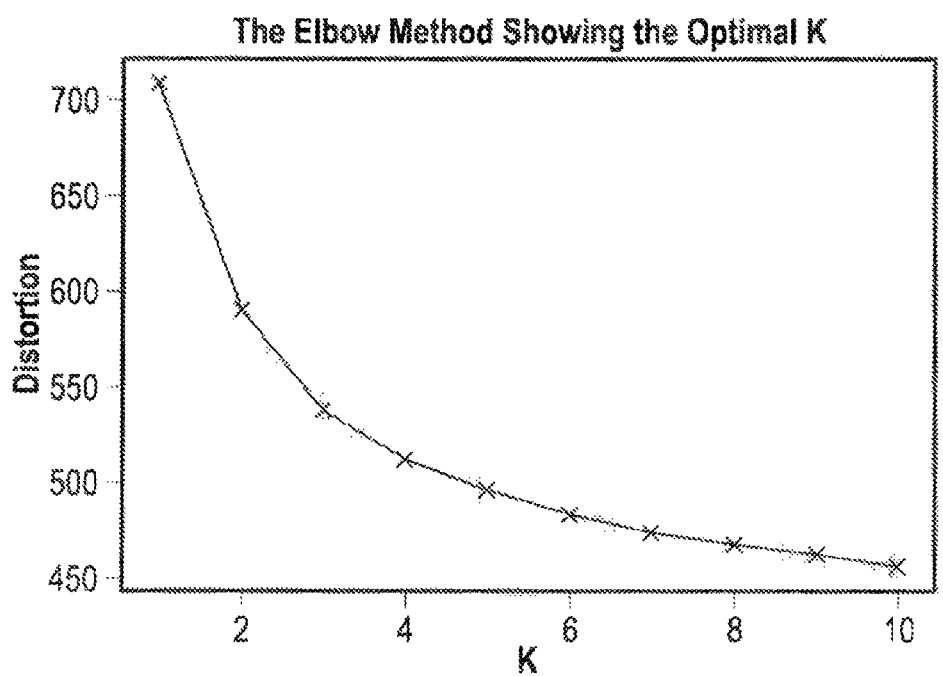
FIG. 12 illustrates an exemplary elbow analysis.

FIG. 12 illustrates an exemplary elbow analysis performed on exemplary layout data set 501, which includes labelled data for 6 locations. For the elbow analysis illustrated in FIG. 12, there is not much reduction in distortion when increasing the number of clusters from 6 to 8 thus it can be concluded that the way of annotating the data represents different distributions.

For offline training, a supervised learning solution, including but not limited to support vector machines (SVM) and random forest (RF) classifiers are used as the base learners. For each of these learners, a K class classification problem is considered where K is the number of positions or rooms where the subject walked. SVM is chosen since it is effective in high dimensional spaces and because of its memory efficiency since it only uses a subset of the dataset in order to calculate the support vectors. SVM is implemented for performing non-linear classification using RBF kernels.

A random forest classifier is chosen, since it is a meta estimator that creates decision trees for different sub-samples of the training set and averaging the performance over them in order to find a better predictive accuracy. 'The performance for both the classifiers is compared when trained on the rounds with no drift and tested on the rounds with drift, which is set aside as a held-out set. The time of training of these two base learners are compared in order to justify the suitability of the corresponding learner for real-time indoor localization.

In this section an incremental learning algorithm is presented based on the proposed feature space. This framework was chosen since it allows the input data to continuously extend the existing knowledge of the model. Although the proposed feature space is almost resistant to concept drifts, the incorporation of incremental learning model results in an adaptation of the model to new data without forgetting its existing knowledge, thus it can adapt quickly to a very slow change in distribution of the data. An SGD classifier with hinge loss and L2-regularizer results in an SVM that can be updated incrementally. For the incremental learning framework, model parameters are updated for each round with the augmented feature space, where minimal drift is present. The model is then tested on the drifted rounds.

FIG. 13 illustrates an exemplary performance evaluation comparison of the location identification at different time intervals. Specifically, FIG. 13 illustrates the performance of different learning algorithms for CSI features incorporating magnitude only, phase only and the proposed augmented feature space. The fable shows that for all the learning algorithms the augmented feature space performs better and is more resistant to drifts. Also, in the case of streaming data, the performance of incremental SVM described is consistently better for the augmented feature space. Thus, it is shown that in case of large incoming data, the augmented feature space presents more robust features in terms of representing the Wi-Fi CSI for localization.

In the deep learning network 150, two algorithms are mainly analyzed: deep convolution neural network and recurrent neural network with long short-term memory.

Deep convolution neural network 152 applies convolution operations to an input image in order to extract essential features that are embedded in the training set. A non-linear activation function is applied followed by the convolution operation that is performed at each layer of network. It can be shown that the Wi-Fi CSI matrix can be projected as a 30*30*3 images where each dimension corresponds to the number of subcarriers, number of packets and the number of streams respectively. For the magnitude data in order to construct an RGB image, only consider 3 streams are considered. Instead of using stacked convolution layers, followed by max pooling and dropout to reduce over-fitting an inception module is used. In an exemplary CNN structure, each layer is chosen either to perform convolution with defined filter size, max pooling or dropout operation to the output of the previous layer. An inception module suggests using all of them. Thus, instead of adding particular convolution filter size layer by layer, inception module suggests including all 1*1, 3*3 and 5*5 filters and perform convolution on the output of the previous layer. CNN with inception module requires a smaller number of parameters and achieves improved performance rather than the conventional architecture.

A long short-term memory (LSTM) is a class of recurrent: neural network (RNN) of specific type. RNN along with LSTM module were used to model temporal sequences, they are specifically used for sequences that have their long-range time dependencies. The CSI data are obtained with a sampling rate of 20 packets/second. Since localization data corresponds to a 1-minute walk in each room, and classification on the data is usually done on a packet by packet basis or on short frames of data, an RNN with an LSTM module is used for many to one sequence modelling. The RNN with an LSTM module performs the classification after it sees every 80th input which roughly corresponds to 4 seconds of data.

The present invention may be implemented in an application that may be operable using a variety of devices, Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for handling drift in wireless signals, the method comprising:
   acquiring a series of channel state information (CSI) data sets, each CSI data set within the series of CSI data sets comprising channel state information (CSI) data from a wireless access point for a wireless link incorporating the wireless access point associated with an area comprising areas of interest at a point in time;
   processing the acquired series of CSI data sets with a pre-processing module forming part of a system comprising at least a microprocessor to generate a processed series of CSI data sets;
   generating with a feature acquisition module forming part of the system a series of sets of statistical properties, each set of statistical properties generated in dependence upon a CSI data set of the processed series of CSI data sets and representative of the area of interest;
   processing the series of sets of statistical properties with a post-processing module forming part of the system where the post-processing module generates a stream of predictions of a location of a user within the area and filters the stream of predictions; wherein
   each prediction of location of the user is an area of interest within the area.

2. The method according to claim 1, wherein
   the filtering applied by the post-processing module leverages current predictions and previous predictions within the stream of predictions to eliminate outliers within the stream of predictions; wherein
   the current predictions and previous predictions are within a short period of time.

3. The method according to claim 1, wherein
   the filtering applied by the post-processing module leverages series of sets of statistical properties to eliminate outliers within the stream of predictions.

4. The method according to claim 1, wherein
   the post-processing module comprises a clustering unit; and
   the clustering unit comprises a supervised learner comprising one or more machine learning algorithms and an unsupervised learner comprising one or more other machine learning algorithms.

5. The method according to claim 1, wherein
   the post-processing module comprises a clustering unit comprising a supervised learner comprising one or more machine learning algorithms and an unsupervised learner comprising one or more other machine learning algorithms; and
   the unsupervised learner accounts for some areas of interest being similar in their CSI profiles which are employed by the post-processing module to generate a predictions.

6. The method according to claim 1, wherein
   the post-processing module comprises a clustering unit comprising a supervised learner comprising one or more machine learning algorithms and an unsupervised learner comprising one or more other machine learning algorithms;
   the unsupervised learner accounts for some areas of interest being similar in their CSI profiles which are employed by the post-processing module to generate a predictions; and
   the areas of interest within the area are defined by another user prior to the system localizing the user via the stream of predictions.

7. The method according to claim 1, wherein
   the feature acquisition module comprises a stream and subcarrier selection unit such that the series of sets of statistical properties are generated from sub-bands of the wireless link; and
   the sub-bands are a fixed number of sub-bands and are uniformly spaced.

8. The method according to claim 1, wherein
   the feature acquisition module comprises a stream and subcarrier selection unit such that the series of sets of statistical properties are generated from sub-bands of the wireless link; and
   the sub-bands are a fixed number of sub-bands and are uniformly spaced.

9. The method according to claim 1, wherein
   the feature acquisition module comprises a stream and subcarrier selection unit such that the series of sets of statistical properties are generated from a number of sub-carriers of the wireless link which comprises a plurality of sub-carriers;
   the sub-bands are established by a processing comprising:
      initially selecting a fixed number of sub-carriers which are uniformly spaced;
      for each sub-carrier of the number of sub-carriers establishing a magnitude of the sub-carrier and its neighboring sub-carriers within the plurality of sub-carriers;
      determining in dependence upon the magnitude of the sub-carrier and its neighboring sub-carriers within the plurality of sub-carriers whether to change the initially selected sub-carrier to another sub-carrier of the plurality of sub-carriers; and
      upon a determination to change the initially selected sub-carrier to another sub-carrier of the plurality of sub-carriers changing the initially selected sub-carrier to another sub-carrier of the plurality of sub-carriers.

10. The method according to claim 1, wherein
    each CSI data set within the series of CSI data sets comprises a frame and a packet index;
    the pre-processing module processes each CSI data set within the series of CSI data sets to generate a first derivative of the frame with respect to packet index and a second derivative of the frame with respect to packet index.

11. The method according to claim 1, wherein
    each CSI data set within the series of CSI data sets comprises a frame and a packet index;
    the pre-processing module processes each CSI data set within the series of CSI data sets by:

applying a data preparation process with respect to subcarrier index to compensate for temporal instabilities by applying a fixed-score scaling normalization and digital filtering to the frame; and applying another data preparation step along a frequency axis by applying a normalization and digital filtering to the frame;

generating a first derivative of the frame with respect to packet index; and generating a second derivative of the frame with respect to packet index.

12. The method according to claim 1, wherein generating with the feature acquisition module forming part of the system the series of sets of statistical properties comprises applying one or more feature extraction strategies to each CSI data set of the processed series of CSI data sets;

each feature extraction strategy of the one or more feature extraction strategies assumes that motion of the user within the area creates one of identifiable features over time and identifiable changes over multiple signal paths and frequency bands.

13. The method according to claim 1, wherein each CSI data set within the series of CSI data sets comprises a frame and a packet index;

generating with the feature acquisition module forming part of the system the series of sets of statistical properties comprises applying one or more feature extraction strategies to each CSI data set of the processed series of CSI data sets; and each feature extraction strategy of the one or more feature extraction strategies assumes that motion of the user within the area creates one of identifiable features over time and identifiable changes over multiple signal paths and frequency bands;

each feature extraction strategy calculates a statistical feature along a first axis of the frame an averages the statistical feature along a second axis of the frame; and an axis of the frame is one of a packet axis, stream axis and a sub-carrier axis.

14. The method according to claim 1, wherein the pre-processing module applies a filter to the received series of CSI data sets; and the filter executes a process of analysing successive packets of received data received with the wireless access point, establishing for each packet a received signal strength indicator (RSSI) value, identifying a sudden peak in RSSI value; and discarding those packets associated with the sudden peak in RSSI value.

* * * * *